US007801906B2

(12) United States Patent
Day et al.

(10) Patent No.: US 7,801,906 B2
(45) Date of Patent: *Sep. 21, 2010

(54) SYSTEM AND METHOD FOR STORING AND RETRIEVING FILENAMES AND FILES IN COMPUTER MEMORY

(75) Inventors: Mark S. Day, Saratoga, CA (US);
Donald J. Brady, San Jose, CA (US);
Deric S. Horn, San Jose, CA (US)

(73) Assignee: Apple Inc., Cupertino, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 11/360,797

(22) Filed: Feb. 22, 2006

(65) Prior Publication Data

US 2006/0143201 A1    Jun. 29, 2006

Related U.S. Application Data

(63) Continuation of application No. 10/177,715, filed on Jun. 20, 2002, now Pat. No. 7,013,314, which is a continuation of application No. 09/213,199, filed on Dec. 17, 1998, now Pat. No. 6,434,574.

(51) Int. Cl.
G06F 7/00 (2006.01)
G06F 17/30 (2006.01)
(52) U.S. Cl. ................. 707/758; 707/760; 707/821
(58) Field of Classification Search .......... None
See application file for complete search history.

(56) References Cited

U.S. PATENT DOCUMENTS

| | | | |
|---|---|---|---|
| 5,454,046 A | 9/1995 | Carman, II | |
| 5,682,158 A * | 10/1997 | Edberg et al. | ......... 341/90 |
| 5,778,213 A * | 7/1998 | Shakib et al. | ......... 703/27 |
| 5,784,069 A | 7/1998 | Daniels et al. | |
| 5,784,071 A | 7/1998 | Tang et al. | |
| 5,787,452 A | 7/1998 | McKenna | |
| 5,793,381 A | 8/1998 | Edberg et al. | |
| 5,832,507 A | 11/1998 | Harper et al. | |
| 5,899,988 A * | 5/1999 | Depledge et al. | ......... 707/3 |
| 5,940,845 A | 8/1999 | Prager et al. | |
| 6,035,268 A * | 3/2000 | Carus et al. | ......... 704/9 |
| 6,084,600 A | 7/2000 | Munshi | |
| 6,131,082 A | 10/2000 | Hargrave, III et al. | |
| 6,144,969 A | 11/2000 | Inokuchi et al. | |
| 6,366,988 B1 * | 4/2002 | Skiba et al. | ......... 711/165 |
| 6,434,574 B1 | 8/2002 | Day et al. | |

OTHER PUBLICATIONS

Atkin et al., "IBM Worldwide Language Support", Eleventh International Unicode Conference, San Jose, Sep. 1997, pp. 1-7.
Kevin Matz, "Binary Manipulations", Copyright 1997, pp. 1-4.
Mudawwar, "A truly Multilingual Approach to Text Ecoding", 1997, IEEE, pp. 37-43.

* cited by examiner

*Primary Examiner*—Charles Rones
*Assistant Examiner*—Alicia M Lewis
(74) *Attorney, Agent, or Firm*—Blakely, Sokoloff, Taylor & Zafman LLP

(57) ABSTRACT

The invention receives a request to store a file having a filename written in a first text encoding, converts the filename into a Unicode filename and stores the Unicode filename and the file into memory. The invention then sets a flag, associated with the memory, indicating that a first text encoding has been used. To retrieve a Unicode filename, the invention receives a request to locate a Unicode filename from memory. Next, the invention uses a predetermined text encoding to convert the filename into Unicode. The invention then searches for the Unicode filename in the memory. If the Unicode filename is not found, the invention uses a next text encoding from the set of text encodings which have been used, to repeat the conversion and searches the memory until the Unicode filename is identified. Lastly, the Unicode file is retrieved.

18 Claims, 6 Drawing Sheets

SYSTEM AND METHOD FOR STORING AND RETRIEVING FILENAMES AND FILES IN COMPUTER MEMORY

This application is a continuation application of U.S. patent application Ser. No. 10/177,715, filed Jun. 20, 2002 now U.S. Pat. No. 7,013,314, which is a continuation of U.S. patent application Ser. No. 09/213,199, filed Dec. 17, 1998, now issued as U.S. Pat. No. 6,434,574.

BACKGROUND OF THE INVENTION

1. Field of the Invention

This invention relates generally to computer operating systems and more particularly to storing and retrieving filenames in computer memory.

2. Description of the Background Art

The storing and retrieving of filenames in computer memory is extremely important to all computer users. When a computer user saves a file and filename into computer memory, it is important that the filename remain uniquely identifiable regardless of any other filenames or text encodings saved in the memory. If a filename is not uniquely identifiable, then a computer may be unable to retrieve the named file. Further, if the memory containing the filename is moved to a different computer then that filename must remain identifiable if the named file is to be retrievable.

Conventionally, a filename identity is represented by a string of bytes ("encoding") stored in computer memory. A conventional Roman character based computer system will interpret the encoding to represent Roman characters in the American Standard Code for Information Interchange (ASCII) character set, even if the encoding actually represents Japanese characters. For example, a Japanese computer user may save a file with a Japanese filename onto a removable memory device, such as a floppy disk. The Japanese filename encoding is interpreted by a conventional Japanese character based computer system to be Japanese characters. However, if the Japanese user then inserts the removable memory device into a conventional Roman character based computer system, the Roman computer system will assume the Japanese encoding actually represents a Roman character filename rather than a Japanese character filename.

A problem with the conventional Roman character based computer system is that because it assumes that a filename is in Roman characters, it may equate two non-Roman character filenames as being identical. This is because a Roman computer system treats uppercase and lowercase letters in a filename as equivalent. Therefore, a Roman computer system would assume that the filenames "Example.txt" and "example.txt" (and their associated files) are the same even though they are represented by different strings of bytes, possibly leading to the assumption that two non-Roman filenames, which vary only by case, are identical. If a Roman computer system misinterprets a non-Roman filename, the system may mistakenly open the wrong file or may refuse to create a new file since it believes that that filename is already in use.

FIG. 1 is a diagram of Japanese characters in which characters within any given column appear identical to a conventional Roman character based computer system. For example, characters 104, 106, 108 and 110 in column 102 appear identical to a prior art Roman computer system because it treats all filenames as if they were written in the Roman alphabet. Therefore, if two Japanese filenames differed by just one character, such as characters 104 and 106, a prior art Roman computer system would actually consider them to be identical. Similar problems occur with other text encodings but the problem is most acute in Japanese and Chinese text encodings since in these languages each character is a word and therefore filenames are shorter and more likely to vary by just one character.

A Roman character based prior art system can only store filenames in Roman text encodings as partially represented by ASCII text encoding table 200 of FIG. 2. Each Roman character has its own encoding. For instance, character 202, the letter "A", is stored as 7-bit encoding 204. However, because ASCII only allows 7 bit encodings, which means that ASCII can encode only 128 characters, basic ASCII encoding table 200 contains no encodings for Japanese or any other language that uses non-Roman characters. Japanese and other east-asian languages can easily have several thousand characters that need to be encoded. Therefore, a prior art Roman character based computer system cannot always accurately store or retrieve some east-asian filenames or other non-Roman filenames.

Therefore, an improved system and method are needed to store and retrieve filenames and files in a computer system.

SUMMARY OF THE INVENTION

The present invention provides a system and method for accurately storing and retrieving filenames in computer memory by converting filenames into Unicode text encoding. The Unicode Standard, like the ASCII text encoding standard and others, encodes each character as a numerical value. However, instead of encoding simply in ASCII, Unicode text encoding encodes all the characters used in the world's major written languages, including Greek, Arabic, Tamil, Thai, Japanese, Korean and many others.

The invention stores a filename into computer memory by first determining a default text encoding based upon which it converts the filename into Unicode text encoding. If the conversion is successful, the invention stores the Unicode text-encoded filename into computer memory and sets a bit that corresponds to the default text encoding in an Encoding Bitmap located in computer memory.

If the conversion based on the default text encoding is unsuccessful, the invention tries using Roman text encoding to convert the filename into Unicode text encoding. Once the conversion is complete, the invention stores the filename into computer memory and sets the bit that corresponds to Roman text encoding in the encoding bitmap. The invention assumes that any sequence of bytes can be converted to Unicode using Roman text encoding, which assigns a meaning to every possible byte sequence. If conversion using the default encoding fails, conversion using Roman text encoding will definitely succeed, even if it produces the wrong Unicode characters.

To retrieve a filename, the invention first converts the retrieval request into Unicode text encoding based on the default text encoding of the system. The invention then searches the computer memory for a matching Unicode text encoded filename. If the search is successful, the search result is returned. If the search is not successful, the invention determines if Roman text encoding is the default text encoding. If Roman text encoding is not the default text encoding, the invention uses Roman text encoding to convert the retrieval request into Unicode text encoding and then searches the computer memory for a matching Unicode filename. If the search is successful, a search result is returned.

If the search is not successful, or if Roman text encoding is the default text encoding, the invention next retrieves a list of all text encodings previously used in the system as specified in an Encoding Bitmap located in the computer memory of the system. The invention then converts the retrieval request into Unicode text encoding based on each text encoding specified in the encoding bitmap and uses each conversion to search the computer memory for a match. If a match is found, the invention returns the search result.

Finally, if the search is still not successful the invention converts the retrieval request into Unicode text encoding based on any other text encodings installed in the computer memory that have yet to be tried. The invention then uses each conversion in searching the computer memory for a matching Unicode filename. If the search is successful, the invention returns the search result. If the search is not successful, the invention returns an error message.

Accordingly, the present invention not only more accurately and efficiently stores and retrieves filenames in computer memory but also allows multiple encodings to be used in computer memory over time.

DETAILED DESCRIPTION OF THE PREFERRED EMBODIMENT

The present invention relates to an improvement in storing filenames in, and retrieving them from, computer memory.

Figure 1:
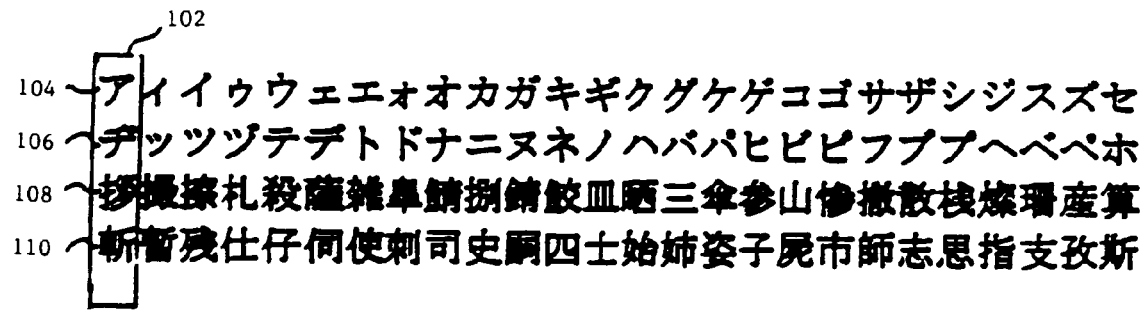
FIG. 1 is a diagram of Japanese characters in columns that appear identical when storing or retrieving a filename using a prior art system.
Figure 2:
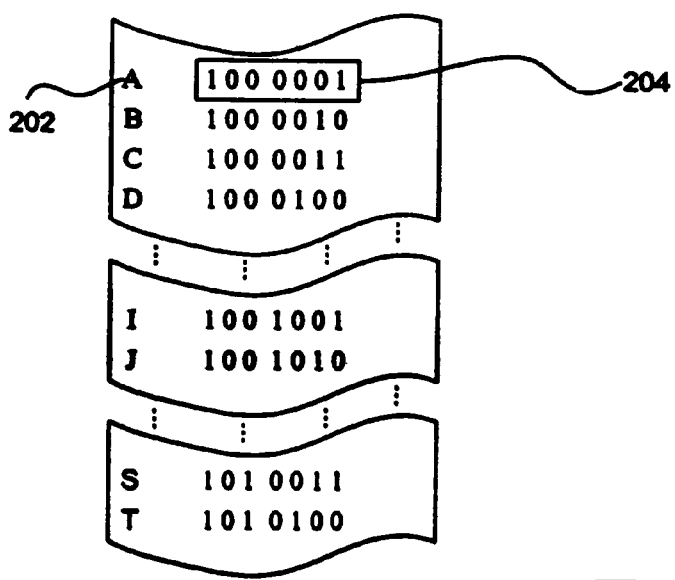
FIG. 2 is a diagram of ASCII text encodings used by a prior art system.
Figure 3:
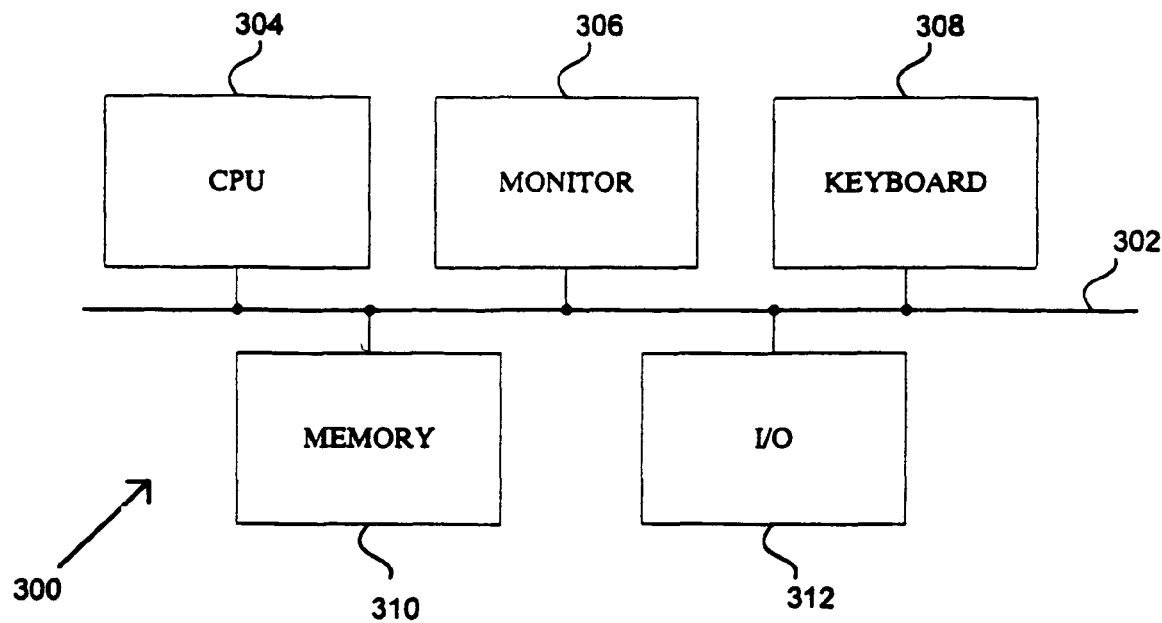
FIG. 3 is a block diagram of a computer system suitable for use with the present invention.

FIG. 3 is a block diagram of a computer system suitable for use with the invention. Computer system 300 preferably includes a Central Processing Unit (CPU) 304, a monitor 306, a keyboard 308, memory 310, and an input and output (I/O) interface 312, all connected by a system bus 302. Memory 310 may comprise a hard disk drive, random access memory (RAM) or any other appropriate memory configuration.

Figure 4:
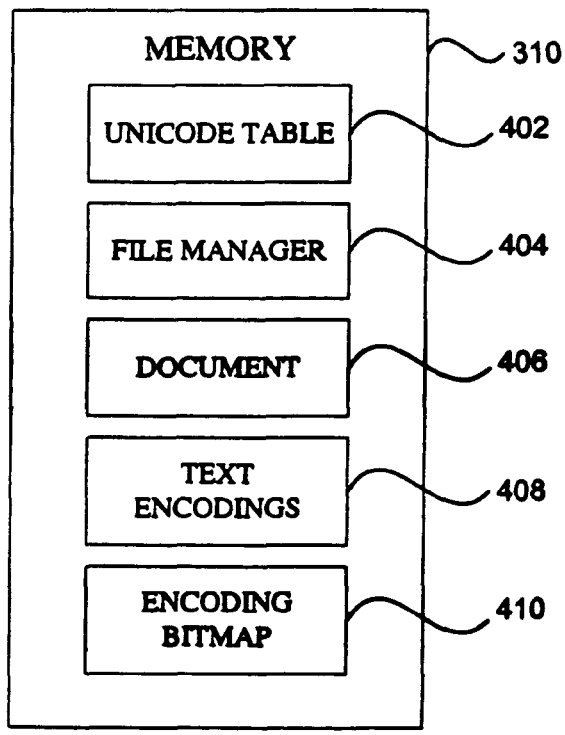
FIG. 4 is a block diagram of the preferred allocation of the memory shown in FIG. 3.
Figure 5:
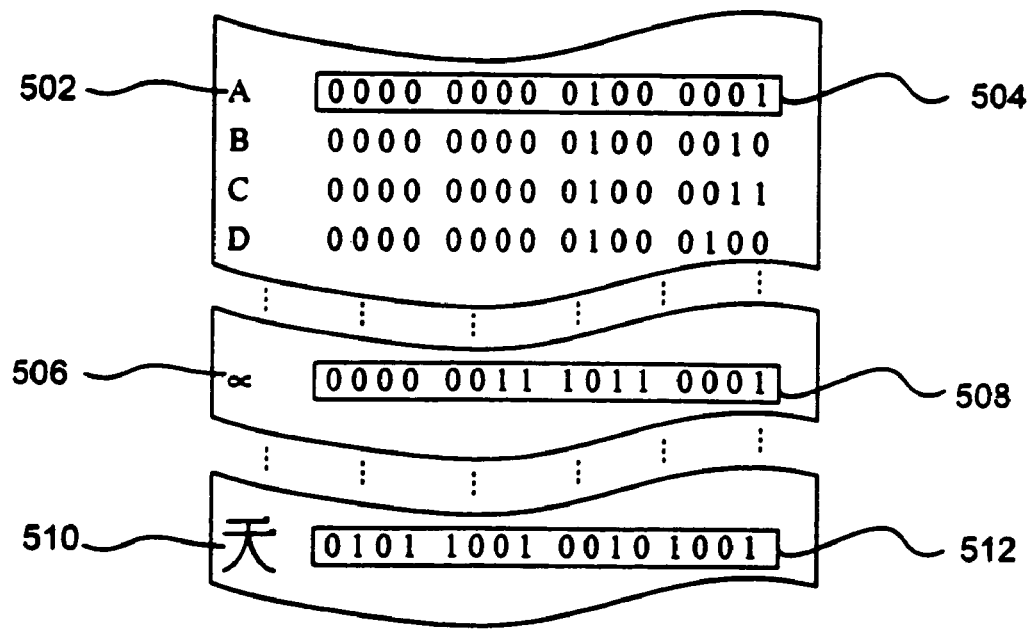
FIG. 5 is a block diagram of the preferred embodiment of the Unicode Table in the memory shown in FIG. 4.

FIG. 4 is a block diagram of the preferred allocation of memory 310, which stores a Unicode table 402 that contains 16 bit encodings for most modern written languages as discussed further in conjunction with FIG. 5. Memory 310 also stores a File Manager 404 which manages document 406 and other documents with their respective filenames that are stored in memory 310, as discussed further in conjunction with FIG. 7, FIG. 8a and FIG. 8b. Memory 310 also stores text encodings 408 for various languages such as Roman, Greek and Japanese, and an encoding bitmap 410 which lists all previously used text encodings, as discussed further in conjunction with FIG. 6.

FIG. 5 is a diagram of the preferred embodiment of the Unicode Table 402, which contains bit encodings for most of the world's modern written languages. Unicode, published as The Unicode Standard, Worldwide Character Encoding, is now the standard for representing text. Unicode uses a 16-bit coding scheme that allows for 65,536 distinct characters—more than enough to include all languages in use today. Currently, Unicode text encoding covers 38,887 different characters. For example, the Roman character "A" 502 is represented by bit encoding 504. The Greek character "α" 506 is represented by bit encoding 508. The Chinese character for sky ("tian" in Mandarin Chinese and "tin" in Cantonese) 510 is represented by bit encoding 512. Most modern written languages can be encoded using Unicode text encoding. However, some relatively obscure languages in current use, such as Cherokee and Mongolian, cannot be encoded using Unicode text encoding. Accordingly, almost any filename can be accurately represented in its native language using Unicode text encoding instead of having to be converted, possibly inaccurately, to Roman characters.

Figure 6:
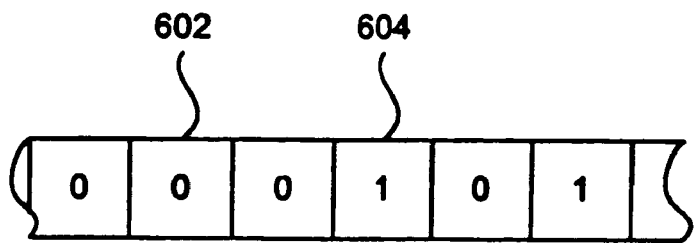
FIG. 6 is a block diagram of the preferred embodiment of the Encoding Bitmap in the memory shown in FIG. 4.

FIG. 6 is a diagram of the preferred embodiment of the FIG. 4 Encoding Bitmap 410, which contains a list of all text encodings previously used in system 300. Whenever a given text encoding is used in system 300, file manager 404 sets a relevant field in encoding bitmap 410. For instance, if field 602 represents Hebrew and Hebrew has not been used in system 300, field 602 contains a 0. If field 604 represents Arabic and Arabic has been used in system 300, field 604 contains a 1.

Figure 7:
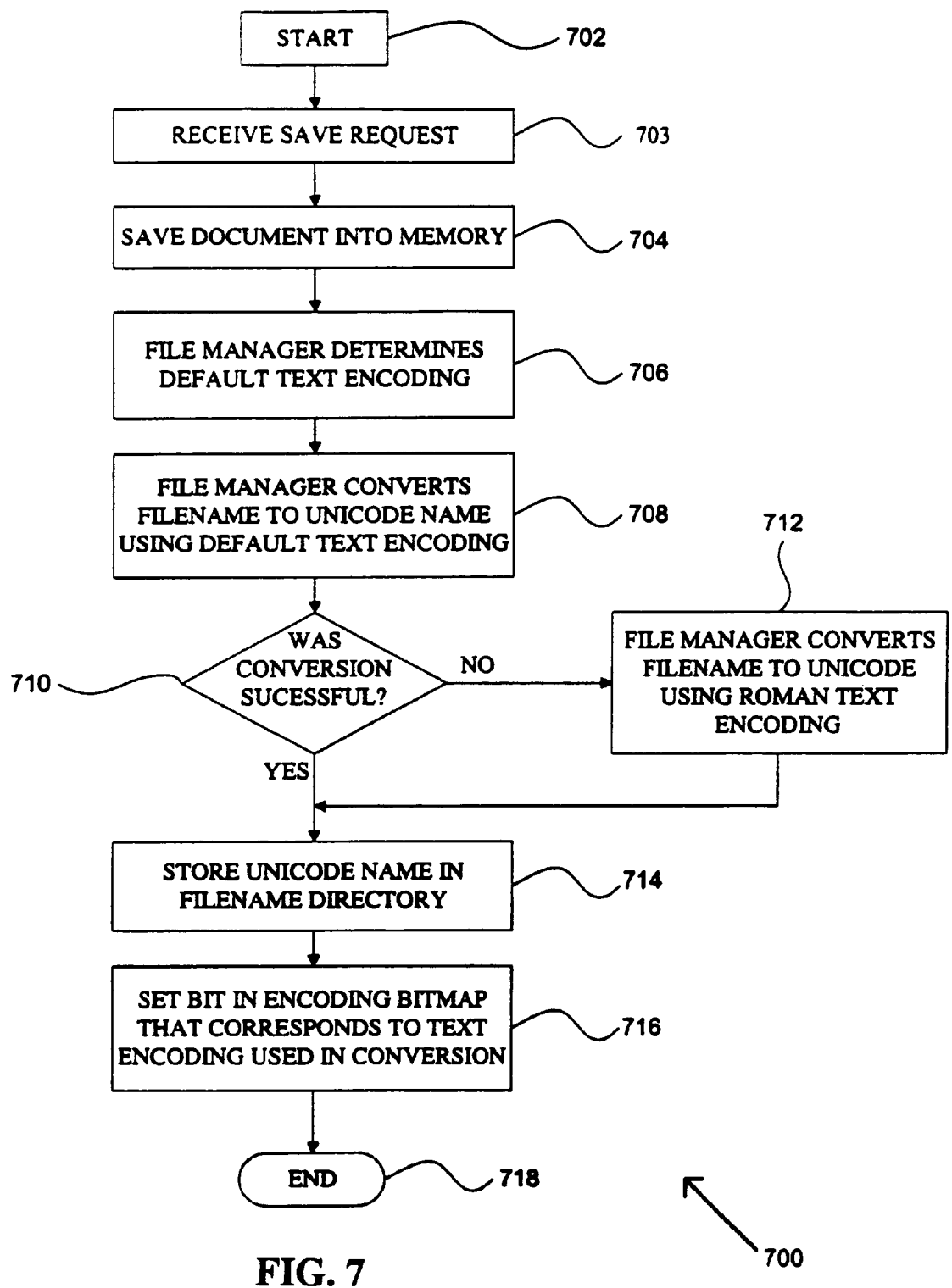
FIG. 7 is a flowchart of preferred method steps for storing a filename into computer memory according to the present invention.

FIG. 7 is a flowchart of steps in a preferred method 700 for file manager 404 to store a filename into computer memory 310 according to the Invention. In step 703, file manager 404 receives a "save" request, which contains filename information for document 406. Alternatively, the "save" request can be a request to change a filename. In step 704, file manager 404 creates a file and/or saves document 406 in memory 310. If the save request in step 703 was a change filename request, step 704 can be skipped. The contents of the document 406 can also be saved in memory 310 after completion of the method 700.

In step 706, file manager 404 determines a default text encoding of system 300, which in this case is a text encoding used to view filenames on monitor 306. In step 708, file manager 404 uses the default text encoding determined in step 706 to convert the filename to a Unicode name.

Step 710 determines whether the step 708 conversion using the default text encoding was successful. If the step 708 conversion was not successful, then in step 712 file manager 404 uses Roman text encoding to convert the user-entered filename to Unicode text encoding. Note that step 712 cannot fail. Even if the filename was not actually written in Roman characters, method 700 will still convert the user-entered filename to Unicode using Roman encoding. This is because all possible byte sequences yield valid Roman characters that can be converted into Unicode. The filename will not be in the intended characters, but the filename will be individually distinguishable.

Once the step 712 conversion is complete, or if the step 708 conversion was successful, then in step 714 file manager 404 saves the Unicode name to memory 310. In step 716, Me manager 404 sets a bit in encoding bitmap 410 that corresponds to the type of text encoding used to convert the user-entered filename. In step 718 method 700 ends.

Figure 8A:
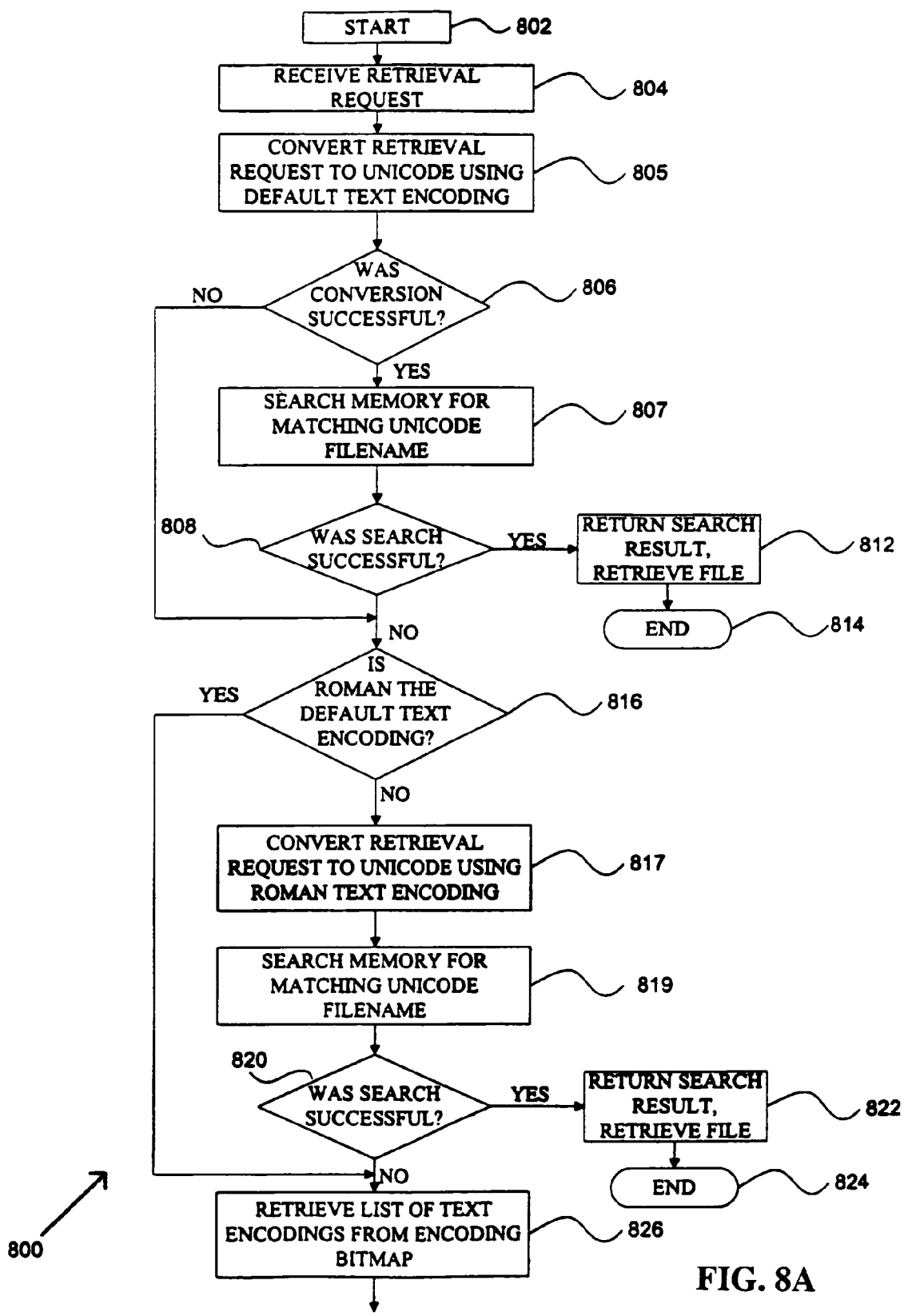
FIGS. 8a and 8b are a flowchart of preferred method steps for retrieving a filename from computer memory according to the present invention.
Figure 8B:
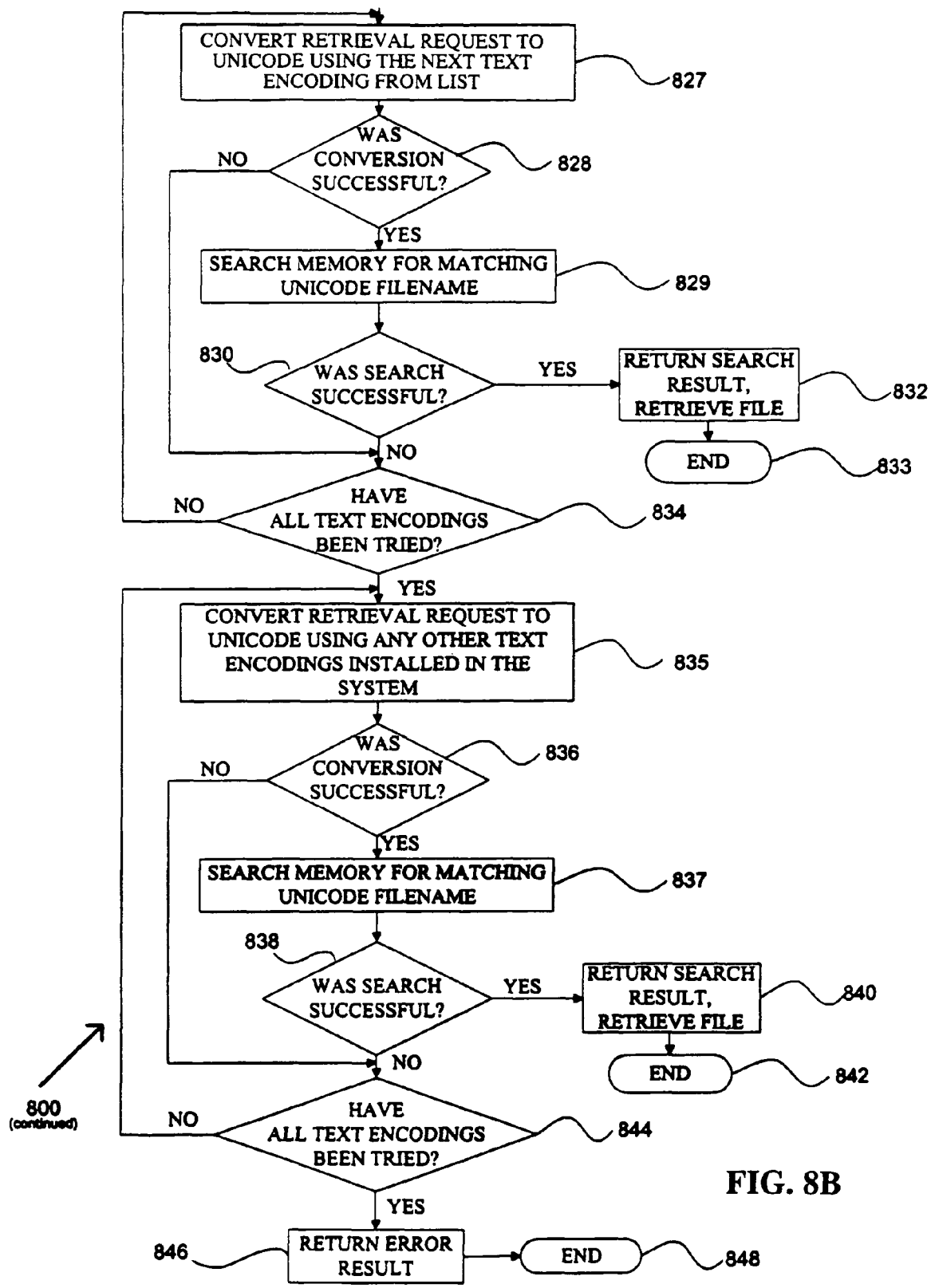

FIGS. 8a and 8b are a flowchart of steps in a preferred method 800 for file manager 404 to retrieve a filename from computer memory according to the invention. In step 804 file manager 404 receives a search request which was generated when a system 300 user attempted to open document 406, or any other document, stored in memory 310. The search request contains a user-entered filename. In step 805 file manager 404 converts the user-entered filename to Unicode text encoding based on the default text encoding of system 300. As discussed in conjunction with FIG. 7, the default text encoding in this example is the text encoding used to view filenames on monitor 306. If the step 805 conversion was not successful, then file manager 404 proceeds to step 816 as discussed below. If the conversion was successful, then in step 807 file manager 404 searches memory 310 for the converted filename. If file manager 404 locates a matching filename, file manager 404 returns the search result and retrieves the file having the matching filename in step 812 and method 800 ends in step 814.

If the step 807 search did not locate a matching filename, or if the step 805 conversion was not successful, then in step 816 file manager 404 determines if Roman text encoding is the default text encoding of system 300. If Roman text encoding is not the default text encoding, then in step 817 file manager 404 converts the user-entered filename to Unicode text encoding using Roman text encoding. In step 819, file manager 404 searches memory 310 for the converted filename. If it finds a matching filename, then in step 822 file manager 404 returns a search result and retrieves the file having the matching filename, and method 800 ends in step 824.

If the step 819 search did not locate a matching filename, or if in step 816 file manager 404 determined that Roman text encoding is the default text encoding of system 300, then in step 826 file manager 404 retrieves a list of text encodings from encoding bitmap 410.

Next, in step 827, file manager 404 converts the user-entered filename into Unicode text encoding using a text encoding from the list retrieved in step 826 from encoding bitmap 410. File manager 404 converts the filename into Unicode using only text encodings not already used in steps 805 and 817. However, in practice system 300 will probably only have installed one or two text encodings—usually Roman and a local text encoding such as Japanese. The local text encoding is normally set as the default text encoding that is tried in step 805. Therefore, method 800 generally is successful at either step 808 or step 820 and does not reach step 826.

If the step 827 conversion is not successful, then File Manager 404 proceeds to step 834. If the step 827 conversion is successful, then in step 829 file manager 404 uses the converted user-entered filename to search memory 310 for a matching Unicode filename. If in step 830 the search is successful, then in step 832 file manager 404 returns a search result and retrieves the file having the matching filename, and in step 833 method 800 ends. If in step 830 the search was unsuccessful, or if the step 827 conversion was unsuccessful, then in step 834 file manager 404 determines if there are other text encodings listed in encoding bitmap 410 that have not been tried. If there are some text encodings that have not yet been tried, then file manager 404 returns to step 827.

If in step 834 all text encodings listed in encoding bitmap 410 have been tried, then file manager 404 proceeds to step 835 and tries to convert the user-entered filename into Unicode text encoding based on any other text encodings installed in system 300. As in step 827, file manager 404 tries conversions to Unicode text encoding using only previously untried text encodings. If the step 835 conversion Is unsuccessful, then File Manager 404 proceeds to step 844. Otherwise, in step 837, file manager 404 searches memory 310 for a matching Unicode filename. If the search is successful, then in step 840 file manager 404 returns a search result and retrieves the file having the matching filename, and in step 842 method 800 ends. If the search is unsuccessful, but in step 844 not all text encodings have been tried, then file manager 404 returns to step 835 and tries to convert the user-entered filename to Unicode text encoding using another text encoding. If in step 844 all the text encodings installed in system 300 have been tried, then in step 846 file manager 404 returns an error result and in step 848 the method 800 halts.

The invention has been explained with reference to a preferred embodiment. Other embodiments will be apparent to those skilled in the art in light of this disclosure. For example, the invention may readily be implemented using configurations other than those described in the preferred embodiment. Additionally, the invention may effectively be used in conjunction with systems other than the one described as the preferred embodiment. Therefore, these and other variations upon the preferred embodiments are intended to be covered by the appended claims.

What is claimed is:

1. A computer-implemented method for storing filenames in a memory device, comprising:
    setting a default text encoding to be the same as a text encoding that is used to display text on a monitor coupled to the memory device;
    receiving a first user input, the first user input being a filename, the filename presented on the monitor in the form of the default text encoding;
    converting the filename from the default text encoding to Unicode text encoding to form a converted filename;
    storing the converted filename in the memory device;
    modifying an encoding bitmap to indicate the use of the default text encoding, wherein the encoding bitmap includes a list of text encodings for different languages;
    receiving a second user input, the second user input being the filename, the second user input for a file retrieval request, the filename again presented on the monitor in the form of the default text encoding;
    converting the filename of the second user input from the default text encoding to Unicode text encoding to form a second converted filename; and,
    retrieving the file from the memory device by identifying a match between the converted filename and the second converted filename.

2. The computer-implemented method of claim 1 wherein the encoding bitmap indicates those of the text encodings that have been previously used.

3. The computer implemented method of claim 2 further comprising:
    not identifying a match within the memory device to another converted filename of another retrieval request;
    retrieving a list of previously-used text encodings from the encoding bitmap;
    using a text encoding from the list to convert the filename of the other retrieval request to Unicode text encoding to form a new converted filename of the other retrieval request; and
    attempting to identify a match within the memory device to the new converted filename of the other retrieval request.

4. The computer implemented method of claim 3 wherein the encoding bitmap is located in the memory device.

5. The computer implemented method of claim 1 wherein converting of another file retrieval request is unsuccessful and subsequently:
    determining if Roman text encoding is a default text encoding; and
    if Roman text encoding is not a default text encoding, then using Roman text encoding to convert the retrieval request to Unicode text encoding.

6. The computer implemented method of claim 5 wherein the encoding bitmap is located in the memory device.

7. A computer-readable storage medium having stored instructions for causing a computer to perform operations comprising:
- setting a default text encoding to be the same as a text encoding that is used to display text on a monitor coupled to a memory device;
- receiving a first user input, the first user input being a filename, the filename presented on the monitor in the form of the default text encoding;
- converting the filename from the default text encoding to Unicode text encoding to form a converted filename;
- storing the converted filename in the memory device;
- modifying an encoding bitmap to indicate the use of the default text encoding, wherein the encoding bitmap includes a list of text encodings for different languages;
- receiving a second user input, the second user input being the filename, the second user input for a file retrieval request, the filename again presented on the monitor in the form of the default text encoding;
- converting the filename of the second user input from the default text encoding to Unicode text encoding to form a second converted filename; and,
- retrieving the file from the memory device by identifying a match between the converted filename and the second converted filename.

8. The computer-readable storage medium of claim 7 wherein the encoding bitmap indicates those of the text encodings that have been previously used.

9. The computer-readable storage medium of claim 8 wherein the method further comprises:
- not identifying a match within the memory device to another converted filename of another retrieval request;
- retrieving a list of previously-used text encodings from the encoding bitmap;
- using a text encoding from the list to convert the filename of the other retrieval request to Unicode text encoding to form a new converted filename of the other retrieval request; and
- attempting to identify a match within the memory device to the new converted filename of the other retrieval request.

10. The computer-readable storage medium of claim 9 wherein the encoding bitmap is located in the memory device.

11. The computer-readable storage medium of claim 7 wherein converting of another file retrieval request is unsuccessful and subsequently:
- determining if Roman text encoding is a default text encoding; and
- if Roman text encoding is not a default text encoding, then using Roman text encoding to convert the retrieval request to Unicode text encoding.

12. The computer-readable storage medium of claim 11 wherein the encoding bitmap is located in the memory device.

13. A digital computing system, comprising:
a memory device; and
stored program code to be processed by the digital computing system to perform a method comprising:
- setting a default text encoding to be the same as a text encoding that is used to display text on a monitor coupled to the memory device;
- receiving a first user input, the first user input being a filename, the filename presented on the monitor in the form of the default text encoding;
- converting the filename from the default text encoding to Unicode text encoding to form a converted filename;
- storing the converted filename in the memory device;
- modifying an encoding bitmap to indicate the use of the default text encoding, wherein the encoding bitmap includes a list of text encodings for different languages;
- receiving a second user input, the second user input being the filename, the second user input for a file retrieval request, the filename again presented on the monitor in the form of the default text encoding;
- converting the filename of the second user input from the default text encoding to Unicode text encoding to form a second converted filename; and,
- retrieving the file from the memory device by identifying a match between the converted filename and the second converted filename.

14. The digital computing system of claim 13 wherein the encoding bitmap indicates those of the text encodings that have been previously used.

15. The digital computing system of claim 14 wherein the method further comprises:
- not identifying a match within the memory device to another converted filename of another retrieval request;
- retrieving a list of previously-used text encodings from the encoding bitmap;
- using a text encoding from the list to convert the filename of the other retrieval request to Unicode text encoding to form a new converted filename of the other retrieval request; and
- attempting to identify a match within the memory device to the new converted filename of the other retrieval request.

16. The digital computing system of claim 15 wherein the encoding bitmap is located in the memory device.

17. The digital computing system of claim 13 wherein converting of another file retrieval request is unsuccessful and subsequently:
- determining if Roman text encoding is a default text encoding; and
- if Roman text encoding is not a default text encoding, then using Roman text encoding to convert the retrieval request to Unicode text encoding.

18. The digital computing system of claim 17 wherein the encoding bitmap is located in the memory device.

* * * * *

UNITED STATES PATENT AND TRADEMARK OFFICE
CERTIFICATE OF CORRECTION

| | | |
|---|---|---|
| PATENT NO. | : 7,801,906 B2 | Page 1 of 1 |
| APPLICATION NO. | : 11/360797 | |
| DATED | : September 21, 2010 | |
| INVENTOR(S) | : Mark S. Day et al. | |

It is certified that error appears in the above-identified patent and that said Letters Patent is hereby corrected as shown below:

In column 4, line 29, delete "Invention." and insert -- invention. --, therefor.

In column 4, line 57, delete "Me" and insert -- file --, therefor.

In column 5, line 60, delete "Is" and insert -- is --, therefor.

Signed and Sealed this
Twenty-ninth Day of November, 2011

David J. Kappos
*Director of the United States Patent and Trademark Office*